May 22, 1928.
J. E. JOHNSON
TOOTH BAND
Filed Feb. 1, 1926
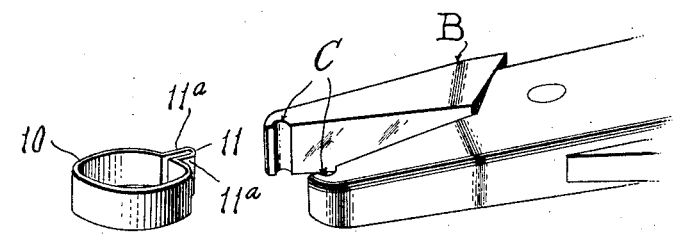
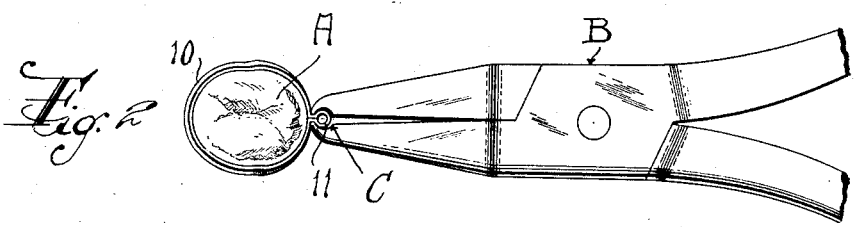
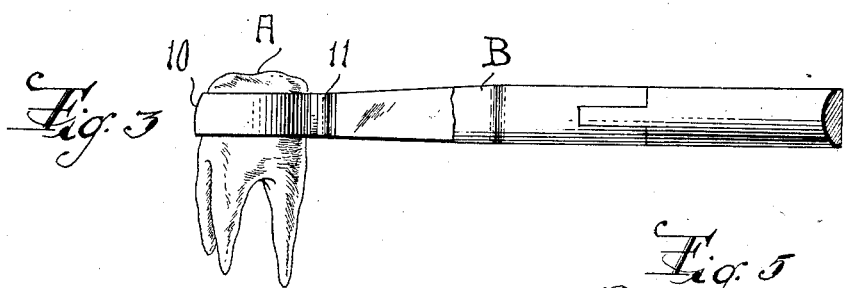
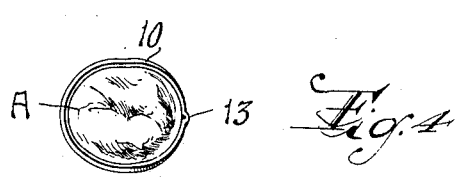
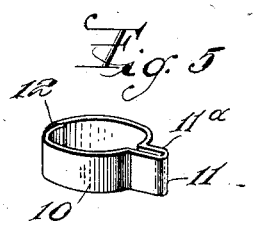
INVENTOR
Joseph E. Johnson,
BY
Everett Rook,
ATTORNEYS.

Patented May 22, 1928.

1,670,361

UNITED STATES PATENT OFFICE.

JOSEPH E. JOHNSON, OF LOUISVILLE, KENTUCKY.

TOOTH BAND.

Application filed February 1, 1926. Serial No. 85,172.

This application is a continuation in part of my application Serial No. 652,406, filed July 18, 1923 in which was described a tooth band and method of applying the same.

The invention relates to bands which are applied to teeth for various purposes, for example for holding tooth straightening devices, for the application of bridges as a matrix in filling teeth, etc.

One object of the invention is to provide a tooth band which is adaptable without modification or alteration for use upon many different sizes of teeth so that the necessity for providing a large number of bands of different sizes or the making by the dentist of a special band for each tooth as is now common, is eliminated.

Another object is to provide a tooth band which can be easily and quickly applied to a tooth with a minimum number of simple operations in much less time and with materially less difficulty than are encountered in applying heretofore known bands according to known methods.

Further objects are to provide such a tooth band which can be tightly drawn around a tooth practically in one pinching operation with pliers; to provide a one-piece tooth band which is inherently expansible and pliable so as to be capable of expanding both during initial application to a tooth and upon removal of the band from a tooth after the fitting operation and also capable of being shaped to snugly fit the irregular contour of a tooth and retain such shape upon removal from the tooth; to provide a novel and improved method of applying tooth bands of pliable material to teeth, and to obtain other results and advantages as may be brought out by the following description.

Referring to the accompanying drawings, in which corresponding and like parts are designated throughout the several views by the same reference characters, Figure 1 is a composite perspective view showing the tooth band as it is initially formed preparatory to application to a tooth, and the tool in the nature of pliers which may be used in setting the band around a tooth;

Figure 2 is a plan view showing the band as applied to a tooth and the method of drawing the same about the tooth;

Figure 3 is a side elevation of the parts shown in Figure 2, portions of the pliers being broken away for clearness in illustration;

Figure 4 is a plan view showing the band applied to a tooth after the band has been soldered and the loop removed, and Figure 5 is a perspective view of a modified form of the band.

Specifically describing the illustrated embodiment of the invention, the tooth band comprises a main ring-like portion 10 preferably substantially uniform in thickness and width to surround a tooth and formed of any suitable material, preferably pliable sheet metal, so as to be capable of permanently conforming to the peripheral shape of a tooth. A substantially U-shaped loop 11 is formed integrally in the ring and radially outwardly offset therefrom, the arms 11ᵃ of said loop being preferably disposed in spaced relation to each other throughout their lengths, in planes approximately parallel to an axial plane of and of substantially the same width as said ring-like portion, as shown in Figure 1 of the drawings. The band may be seamless as shown in Figure 1, or may be formed of a strip of flat sheet metal having its ends permanently secured together as indicated at 12, see Figure 5 of the drawings. It is important to my invention, however, that the arms 11ᵃ of the loop 11 be of the same cross-section as the ring portion 10 at and adjacent their junction therewith and the space between said arms open into the ring for the entire width of the band, so that the end portions of either of said parts ring and loop at their junction can merge into end portions of the other of said parts when the band is applied to a tooth, and thus enable it to extend tightly around the entire circumference of the tooth with uniform cross-section and its ends abutting, as will appear from the following description of the use of the band.

In applying the band to a tooth indicated at A, a band is preferably selected whose ring portion 10 is somewhat smaller than the tooth, so that the arms 11ª of the loop 11 spread a little in applying and the ring retains its place by friction. Then the arms of the loop are pinched together adjacent the ring by any suitable means, such as pliers B the meeting faces of the jaws of which are formed with complemental transverse grooves C to receive the outer end of the loop, as shown in Figure 2. This operation results in drawing the ring portion 10 of the band tightly about the tooth and merges enough of the adjacent end portions of the arms 11ª of the loop 11 into said ring portion as is necessary to complete the entire circumference of the tooth and allow the arms to come together. The material of the band is pressed or worked into the curves in the surface of the tooth by suitable instruments according to the usual practice, after which the band is removed from the tooth and soldered at the juncture of the ring-like portion with the arms of the loop, as indicated at 13. The outstanding portion of the loop is then removed and the material smoothed and polished, whereupon the band is ready for final application to the tooth which is accomplished usually by cementing, the finished band appearing upon the tooth as shown in Figure 4.

While, as has just been described, a band is preferably selected which is smaller than the tooth, it is possible to use a band which is larger than the tooth and engage the jaws of the pliers with the outer surfaces of the end portions of the ring 10 adjacent the loop 11, so as to merge them into the arms 11ª of the loop and close them together, thus securing a tight band around the tooth which can be completed as previously described. In either case the loop permits the ring-like portion 10 to expand when the band is removed from the tooth. Should the loop become spread in the removal of the band from the tooth, the juncture points of the arms of the loop with the ring-like portion serve to indicate the proper size of the ring-like portion and the loop can be again pinched together to bring said juncture points into contact for the soldering operation.

It will be noted that the end portions of the ring 10 and the adjacent end portions of the arms 11ª of the loop 11 all have at their outer sides surfaces to receive the jaws of the pliers B for merging the end portions of one of the parts ring and loop into end portions of the other of said parts, when the band is upon a tooth, the arms 11ª projecting for this purpose from the ends of the ring radially of the latter and thus affording access or clearance for the pliers' jaws to said surfaces.

By my invention, therefore, bands of the same size can be applied to teeth of many different sizes, the end portions of the ring and of the arms of the loop, at the junction of the ring and loop, being merged one into the other by pinching as described, and accordingly it is necessary to manufacture bands of only three or four different sizes for use with all sizes of teeth, thereby materially reducing the cost of manufacture and avoiding the necessity for the manufacturer and dentist to maintain a large stock of bands of many different sizes as is now the common practice where preformed bands are used, such as shown in Patent No. 1,034,591 of August 6, 1912. Furthermore, the band involving the invention is simpler in application than the known type of band which is formed of a strip of metal applied to the tooth by wrapping a string or the like around the strip to draw the latter in close contact with the tooth, as is another common practice. Obviously, also, the construction of the invention enables a much tighter and more accurate fit of the band upon the tooth than is possible with the heretofore known constructions applied according to known methods.

It will be understood that the band may be formed in any suitable manner, for instance by making an endless seamless ring and bending a portion thereof to form the outwardly offset loop 11, as shown in Figure 1, or where the band is to be formed of a straight strip of metal, the strip may be bent into circular form and its ends permanently joined as by means of solder, as indicated at 12 in Figure 5 of the drawings, and the radially projecting loop 11 may be formed in the ring after the ends are connected or by bending the strip to form the loop before the strip is bent into circular form and the ends secured together.

Having thus described the invention, what I claim is:

1. As an article of manufacture, a tooth band having a ring portion to surround a tooth and a substantially U-shaped loop with its arms projecting from the ends of said ring portion radially of the latter, said arms being of the same cross-section as the ring portion at and adjacent their junctions therewith and the space between the arms opening into the ring for the entire width of the band so that the end portions thereat of one of said parts ring and loop can merge into end portions of the other of said parts when the band is applied to a tooth and enable it to extend tightly around the entire circumference of the tooth with uniform cross-sectional area and its ends abutting, all said end portions being pliable and having at their outer sides surfaces to receive the jaws of pliers for so merging the end portions when the band is upon a tooth.

2. As an article of manufacture, a tooth band having a ring portion to surround a tooth and a substantially U-shaped loop with its arms projecting from the ends of said ring portion radially of the latter, said arms being of the same cross-section as the ring portion at and adjacent their junctions therewith and the space between the arms opening into the ring for the entire width of the band so that the end portions of the arms thereat can merge into end portions of the ring when the band is applied to a tooth and form a band with abutting ends extending the entire circumference of the tooth, said end portions of the arms being pliable and having at their outer sides adjacent the ring surfaces to receive the jaws of pliers for so merging them into end portions of the ring upon a tooth.

JOSEPH E. JOHNSON.